United States Patent
Byrne et al.

[11] Patent Number: 5,930,712
[45] Date of Patent: Jul. 27, 1999

[54] DUAL MODE SUBSCRIBER TERMINAL, SINGLE MODE SUBSCRIBER TERMINAL AND A HANDOVER PROCEDURE OF THE DUAL MODE SUBSCRIBER TERMINAL AND THE SINGLE MODE SUBSCRIBER TERMINAL IN A MOBILE TELECOMMUNICATIONS NETWORK

[75] Inventors: John Byrne, Shepperton, United Kingdom; Teuvo Järvelä, Helsinki; Sanna Mäenpää, Espoo, both of Finland

[73] Assignees: Nokia Telecommunications Oy, Espoo; Nokia Mobile Phones Ltd., Salo, both of Finland

[21] Appl. No.: 08/624,643
[22] PCT Filed: Oct. 6, 1994
[86] PCT No.: PCT/FI94/00448
  § 371 Date: Jul. 3, 1996
  § 102(e) Date: Jul. 3, 1996
[87] PCT Pub. No.: WO95/10923
  PCT Pub. Date: Apr. 20, 1995

[30] Foreign Application Priority Data
  Oct. 8, 1993 [GB] United Kingdom ............ 9320815

[51] Int. Cl.$^6$ ............................................. H04B 7/26
[52] U.S. Cl. ...................... 455/437; 455/426; 455/436
[58] Field of Search .................... 455/426, 436, 455/560, 525, 437, 438, 439

[56] References Cited

U.S. PATENT DOCUMENTS

| | | | |
|---|---|---|---|
| 5,212,684 | 5/1993 | MacNamee et al. | 455/436 |
| 5,260,988 | 11/1993 | Shellinger et al. | 455/436 |
| 5,406,615 | 4/1995 | Miller et al. | 455/426 |
| 5,533,027 | 7/1996 | Akerberg et al. | 455/436 |
| 5,574,775 | 11/1996 | Miller et al. | 455/426 |
| 5,613,211 | 3/1997 | Matsumo | 455/51.1 |

FOREIGN PATENT DOCUMENTS

| | | |
|---|---|---|
| 2 225 512 | 5/1990 | United Kingdom . |
| 93/16549 | 8/1993 | WIPO . |

*Primary Examiner*—David R. Hudspeth
*Assistant Examiner*—Daniel Abebe
*Attorney, Agent, or Firm*—Pillsbury Madison & Sutro LLP

[57] ABSTRACT

A dual mode terminal is provided, in which a mobile station of a mobile radio system and cordless telephone are combined. This kind of terminal can have a connection with both a base station of the mobile radio system and a base station (fixed part) of the cordless telephone system. Handover in the case of this dual mode terminal implies the transfer of a call from the base station of the mobile radio system to a base station of the cordless telephone system. A call re-establishment procedure is utilized for inter-system handovers between a cordless telephone system having terminal-initiated handovers and the supporting mobile radio system having network-initiated handovers. A single mode (cordless) terminal and a method of performing handover from a base station of the cordless telephone system to another base station of the cordless telephone system is also provided.

12 Claims, 2 Drawing Sheets

DUAL MODE SUBSCRIBER TERMINAL, SINGLE MODE SUBSCRIBER TERMINAL AND A HANDOVER PROCEDURE OF THE DUAL MODE SUBSCRIBER TERMINAL AND THE SINGLE MODE SUBSCRIBER TERMINAL IN A MOBILE TELECOMMUNICATIONS NETWORK

BACKGROUND OF THE INVENTION

1. Field of the Invention

The invention relates to a mobile telecommunications system including a fixed network comprising mobile exchanges, base stations for mobile stations, and cordless telephone base stations connected to and under control of said mobile exchanges. In particular, the present invention relates to a method for performing handover from the base stations for mobile stations to the cordless telephone base stations.

2. Description of the Related Art

Conventional cordless telephones operate as an extension to the Public Switched Telephone Network (PSTN). A cordless telephone system consists of a portable handset and a base station (a fixed part) connected to PSTN. The first cordless telephone systems were analog systems, such as CT1. Recently digital cordless telephone systems, such as CT2 and DECT (Digital European Cordless Telephone) have been introduced. When a cordless telephone is a subscriber of PSTN, it is accessed by dialing the telephone number associated with the fixed subscriber connection to which the base station is connected. Also the subscriber has access to the PSTN only via the home base station. In CT2 and DECT, also a telepoint service is introduced, whereby a subscriber to the service can make calls away from home via a public base station. Also a common air interface for cordless telephones was introduced to facilitate roaming between systems and to improve service coverage.

There has also been a proposal to combine a cordless telephone system with a cellular mobile telecommunications system to further improve the roaming capabilities by utilizing the mobility control of the cellular network. When combined with the mobile telecommunications systems, the roaming of the cordless telephone handsets within the cordless telephone systems is fully supported. However, the cordless telephone handset is not able to utilize the more extensive radio coverage of the supporting cellular network or to perform handover to or from the cellular network. This disadvantage is due to several reasons.

Firstly, the radio interfaces of cordless telephone systems and the mobile radio systems are usually incompatible.

Secondly, the handover procedures are different. In cordless telephone systems, the handover procedure is usually initiated by the portable terminal. More particularly, when a cordless telephone terminal considers it necessary to change from one base station to another, the terminal scans the frequency band and selects the appropriate base station for the handover. In most of the mobile telephone systems the handover is controlled by the network. The mobile station only measures the quality of the radio connection and forwards the measuring results to the fixed network. One of the network elements, for example a mobile exchange, makes a decision for handover on the basis of the obtained information.

SUMMARY OF THE INVENTION

It is an object of the invention to provide a dual mode subscriber terminal capable of roaming between a cordless telephone system and a mobile radio system supporting it.

It is another object of the invention to provide a method for performing handover from a mobile radio system to a cordless telephone system supported by said mobile telecommunications system.

One aspect of the invention is, in a mobile telecommunications system including a fixed network comprising mobile exchanges, first base stations connected to said mobile exchanges, and second base stations of a cordless telephone system, said second base stations being connected to and under control of said mobile exchanges, dual mode subscriber terminals having a mobile station part for radio communication with said first base stations and a cordless telephone part for radio communication with said second base stations; a method for performing handover from one of said first base stations to one of said second base stations, comprising the steps of initiating a call re-establishment procedure from said cordless telephone part of said dual mode terminal during an on-going call via said mobile station part of said dual-mode terminal and one of said first base stations, sending a call setup message from said cordless telephone part of said dual mode terminal to one of said second base stations having an appropriate field strength, said message including a terminal identity and a call re-establishment message indicator, sending a call re-establishment message from said one of said second base stations to one of said mobile exchanges in response to receipt of said call setup message with said call re-establishment indicator, said call re-establishing message including said terminal identity, re-establishing said on-going call to said cordless telephone part of said dual mode terminal via said one of said second base stations.

Another aspect of the invention is, in a mobile telecommunications system including a fixed network comprising mobile exchanges, first base stations connected to said mobile exchanges, and second base stations of a cordless telephone system, said second base stations being connected to and under control of said mobile exchanges; a dual mode subscriber terminal comprising a mobile station part for radio communication with said first base stations, a cordless telephone part for radio communication with said second base stations, means, responsively to detecting a predetermined condition during an on going call via one of said first base stations and said mobile station part of said dual mode terminal, for activating said cordless telephone part of said dual mode terminal to initiate a call re-establishment procedure, and means for sending a call setup message to said one of said second base stations from said cordless telephone part of said dual mode terminal, said message including a terminal identity and a call re-establishment message indicator.

In the invention, a dual mode terminal is utilized, in which a mobile station of a mobile radio system and a cordless telephone are combined. This kind of terminal can communicate with base stations of the mobile radio system and base stations (fixed part) of the cordless telephone system. Handover in the case of this dual mode terminal can imply the transfer of a call from a base station of the mobile radio system to a base station of the cordless telephone system. As noted before, the primary problem in this concept is that two systems utilizing different handover principles are combined. In cordless telephone systems, such as DECT, handover is a terminal controlled procedure and the terminal will make a decision when the handover is needed. In the mobile radio system, such as GSM, the network will always decide when to perform a handover. The inventive solution is to use a call re-establishment procedure for handover, because it is a terminal initiated procedure and is a feasible procedure in mobile radio systems, such as GSM. Thus, by using a call re-establishment procedure handover can be initiated by a dual mode terminal having a connection with a base station of the mobile radio system. The call re-establishment procedure in mobile radio systems is basically intended for maintaining and re-establishing a call in a case where a mobile station loses a connection to a base station during a call and has to search for a new base station. The mobile radio network maintains all connections and resources associated with a call in the network, and if a call re-establishment message is received from a terminal within a predetermined period of time, the call is re-established. Thus, there will be only a short break in the connection. Now, this call re-establishment procedure is utilized in a novel manner for inter-system handover between a cordless telephone system and the supporting mobile radio system.

Still another aspect of the invention is, in a mobile telecommunications system including a fixed network comprising mobile exchanges, cordless telephones, base stations of a cordless telephone system, said base stations being connected to and under control of said mobile exchanges; a method for performing handover from one of said cordless telephone system base stations to another, comprising the steps of detecting low quality or a loss of connection between a cordless telephone terminal and one of said base stations during an on-going call, detecting an appropriate field strength of another one of said base stations by said cordless telephone terminal, sending a call setup message to said another one of said base stations from said cordless telephone terminal, said message including a terminal identity and a call re-establishment message indicator, sending a call re-establishment message from said another one of said base stations to one of said mobile exchanges in response to receipt of said call setup message with said call re-establishment indicator, said call re-establishing message including said terminal identity, and re-establishing said on-going call to said cordless telephone terminal via said another one of said base stations from said one of said mobile exchanges.

Still another aspect of the invention is a mobile telecommunications system including a fixed network comprising mobile exchanges, cordless telephone terminals, base stations of a cordless telephone system, said base stations being connected to and under control of said mobile exchanges; means for performing handover from one of said cordless telephone base stations to another, said means comprising means for detecting low quality or loss of connection between a cordless telephone terminal and one of said base stations during an on-going call, means for detecting an appropriate field strength of another one of said base stations by said cordless telephone terminal, means for sending a call setup message to said another one of said base stations from said cordless telephone terminal, said message including a terminal identity and a call re-establishment message indicator, means for sending a call re-establishment message from said another one of said base stations to one of said mobile exchanges in response to receipt of said call setup message with said call re-establishment indicator, said call re-establishing message including said terminal identity, and means for re-establishing said on-going call to said cordless telephone terminal via said another one of said base stations from said one of said mobile exchanges.

The call re-establishment handover procedure according to the invention may be applied also to handover between two base stations (fixed parts) of a cordless telephone system connected to a mobile exchange of a mobile radio system. In that case the terminal may also be an ordinary cordless telephone terminal instead of the dual mode terminal according to the invention.

BRIEF DESCRIPTION OF THE DRAWINGS

The invention will be described more specifically with reference to the attached drawings, in which.

DETAILED DESCRIPTION OF THE PREFERRED EMBODIMENTS

In the following the invention will be described using a digital cellular radio system known as GSM (Groupes Speciale Mobile) as an example of a mobile radio system and DECT (Digital European Cordless Telephone) as an example of a cordless telephone systems. However, the invention is not intended to be restricted to these systems. The invention may be applied to any mobile radio system which has a call re-establishment capability, and to any cordless telephone system.

Figure 1:
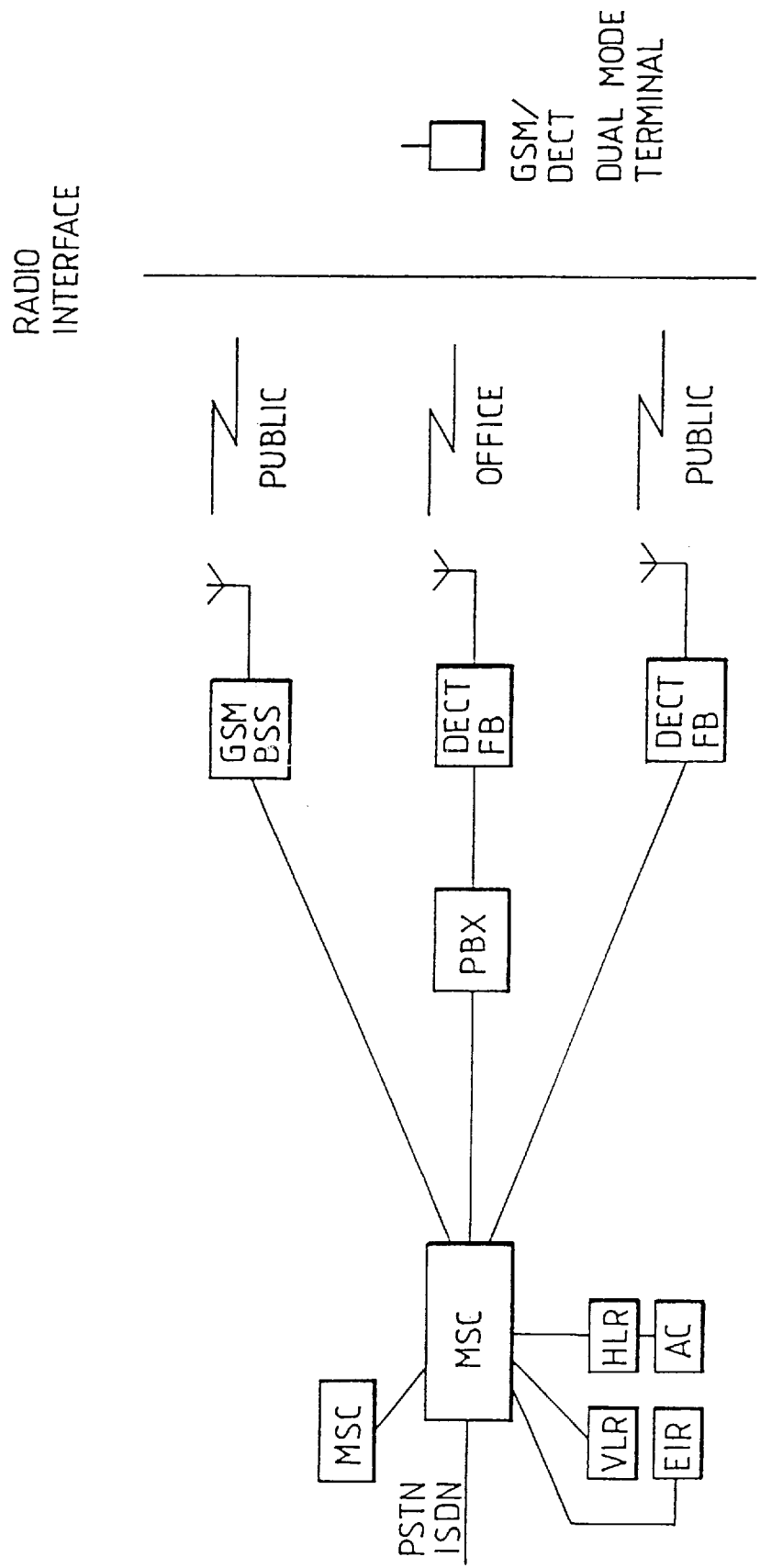
FIG. 1 shows a general diagram of a mobile radio system which supports cordless telephone systems.

FIG. 1 shows the functional environment of GSM/DECT dual mode terminal. In FIG. 1, both base stations BSS of GSM system and fixed parts FP of DECT system are connected to the GSM mobile exchange MSC. One of the DECT fixed parts FP is shown to be connected to the private branch exchange PBX which is further connected to the MSC. The MSC may be connected to other MSC:s, PSTN (Public Switched Telephone Network) or ISDN (Integrated Services Data Network) . The MSC is also connected to the visitor location register VLR, which is a data base maintaining subscriber files on the subscribers visiting in the area of the MSC, and to a home location register HLR which is a data base maintaining subscriber files on all the subscribers in the system, and further to an authentication center AC and to an equipment identity register EIR. For more detailed description of the operation and structure of GSM system, a reference is made to GSM specifications and to a book "The GSM system for mobile communication", M. Mouly and M. Pautet, Palaiseau, France, ISBN:2 9507190-0-7.

Figure 2:
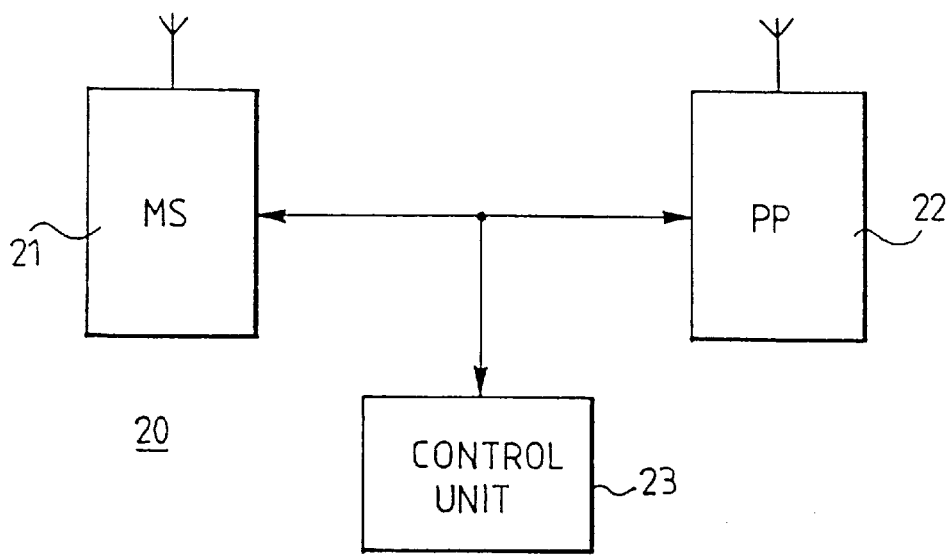
FIG. 2 shows a general diagram of a dual mode subscriber terminal according the invention.

FIG. 2 shows a general view of a GSM/DECT dual mode subscriber terminal 20 according to the invention. The terminal 20 consists of a GSM mobile station part MS 21 and a DECT portable terminal part PP 22. The GSM part MS of the dual mode terminal is used when communicating with GSM base stations. The DECT part PP of the dual mode terminal is used when communicating with DECT fixed parts FP. Both MS and PP include all the necessary equipment, such as radio transceivers, for signalling and communicating over the respective radio interface. It is normally advantageous to embody at least some functions and circuits, such as display, keyboard, power supply, etc., by means of a common circuitry. In FIG. 2, a common control unit 23 is connected to MS and PP parts of the dual mode terminal for controlling the operation thereof.

The GSM network provides a full mobility management support for the cordless telephone systems connected to it. Thus, the GSM network maintains files on the cordless telephone subscribers and the current location thereof and is therefore able to route the calls addressed to the cordless telephone to their current locations. Basically, the cordless telephone subscribers are handled in a similar manner with the ordinary GSM subscribers.

Thus, the dual mode terminal according to the invention is capable of communicating with both GSM base stations and DECT base stations (fixed parts) FP. Consequently, a dual mode terminal should also be able to roam anywhere in the system. However, problems are encountered when the handover from GSM base station BSS to DECT fixed part (or vice versa) is required, since in the DECT system handover is a terminal controlled procedure and the terminal will make a decision when the handover is needed. In the GSM system the network will always decide when to perform a handover.

According to the invention, a GSM/DECT dual mode terminal can imply a transfer of a call from a GSM base station BSS to a DECT fixed part FP by utilizing a call re-establishment procedure for handover. The call re-establishment procedure is a feasible procedure in GSM, and is originally intended for situations where a mobile station loses a connection to a current base station during a call, searches for a new base station and sends a call re-establishment message to the network, e.g. to the mobile exchange controlling the call. The network will maintain all connections and resources associated with the call for a predetermined period of time after losing the connection, and if the call re-establishment message is received within this period, the call will be re-established via the new base station. The call re-establishment procedure is a terminal initiated procedure in GSM, and therefore, by using the call re-establishment procedure a handover can be initiated by a terminal from GSM to DECT.

The inventive handover procedure is described in the following with reference to FIG. 3. The call re-establishment procedure is a standard procedure in GSM, but in DECT specifications, only call re-establishment within a single fixed part FP is completely defined. No proper method for using call re-establishment when handing over from an old FP to a new FP has been defined in DECT. In the following is described how the call re-establishment may be carried out in the GSM/DECT concept.

Figure 3:
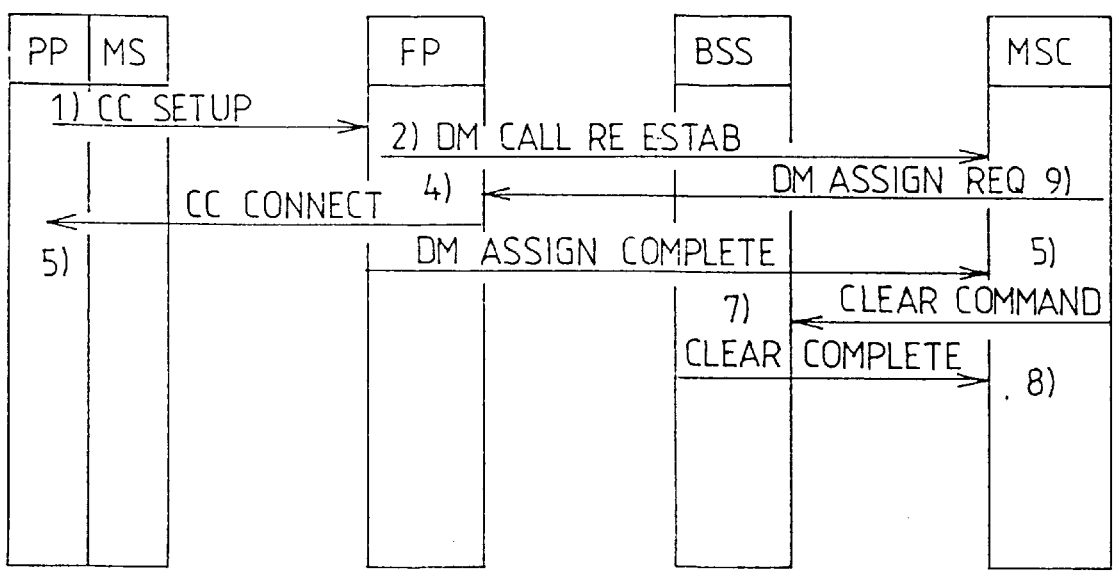
FIG. 3 is a signalling diagram for the handover method according to the invention.

Referring to FIG. 3, let us assume that the mobile station part MS of the dual mode terminal 20 is communicating with a GSM base station BSS. Subsequently the MS part notices that the connection to the base station BSS has been lost, or that the quality of the connection is low, e.g. a field strengh received is under a predetermined threshold. The MS part further notices that it is unable to establish a new connection to another GSM base station BSS. Subsequently, the MS part of the dual mode terminal 20 requests the portable cordless telephone part PP of the dual mode terminal to initiate a call re-establishment procedure. In response to the request, the PP part of the dual mode terminal searches for an appropriate DECT fixed part FP in step 1. If the PP part detects an appropriate field strength of one of the DECT fixed parts FP, the PP part attempts a call re-establishment to that fixed part FP by sending a setup message CC-SETUP. The call setup message CC-SETUP may be modified from a standard CC-SETUP message of the DECT common interface specification (DECT CI) so that the basic service information element in the message can indicate a call re-establishment. Alternatively, it may be possible to make an agreement that a standard CC-SETUP message with the Basic service element "External Handover Call Set Up" which is presently dedicated to other use will be interpreted as a call re-establishment message when used in a GSM/DECT environment. Thus, a call setup message sent in step 1 in FIG. 3 includes the following information elements: Portable identity and basic service information element indicating call re-establishment.

In an alternative embodiment of the invention the cordless telephone part may independently initiate the call re-establish procedure without the request from the MS part, if it detects an appropriate field strength of one of the DECT fixed parts FP. In this embodiment of the invention, the priority of use of the DECT fixed parts for calls is higher than the priority of use of the GSM base stations BSS for calls. In other words the fixed parts are favored when the dual mode terminal would be able to establish a connection with both base station types. The priority of use may be based on lower costs in a cordless system, for example. The PP part informs the MS part that a call re-established procedure is initiated. Remaining parts of the procedure are similar to as in the preferred embodiment of the invention.

In step 2, having received the CC-SETUP message from the PP part of the dual mode terminal, the fixed part FP can derive from the basic service information element that it is a call re-establishment request. Therefore the fixed part FP sends a DM CALL RE-ESTABLISHMENT message according to DSS.1+ protocol to the MSC. DSS.1+ protocol is the DSS.1 protocol enhanced with mobility management. The message includes the following information elements: Portable identity and mobile station class mark indicating a DECT-terminal.

In step 3 of FIG. 3, having received the DM CALL RE-ESTABLISHMENT message the MSC finds out, based on the portable identity, all the required information about the call. This includes, for example finding out the identity of the old GSM base station. Subsequently, the MSC sends a DM ASSIGNMENT REQ message according to DSS.1+ protocol to the new fixed part. This message is used in GSM for requesting the new base station to assign radio resources. This message may not be necessary for performing call re-establishment for DECT terminals. However, it is preferable to keep this message in the procedure for consistency from a GSM network point of view. The message includes the following information elements: portable identity.

In step 4, having received the DM ASSIGNMENT REQ message the new fixed part FP initiates the connection by sending CC CONNECT message according to DECT CI to the PP part of the dual mode terminal. In parallel, the fixed part FP sends a DM ASSIGNMENT COMplete message according to DSS.1+ as an acknowledgement to the MSC.

In step 5, having received a CC-CONNECT message from the fixed part FP, the PP part of the dual mode terminal sets up the connection.

In step 6, having received the acknowledgement message from the new DECT fixed part FP the MSC re-establishes the call to the PP part of the dual mode terminal via the new fixed part FP. The MSC also initiates release of the connection to the old GSM base station BSS by sending a CLEAR COMMAND message according to specification GSM 08.08.

In step 7, having received the CLEAR COMMAND message the old base station BSS releases the resources associated with the call. Subsequently, the BSS acknowledges the release by sending CLEAR COMplete message according to the specification GSM 08.08.

In step 8, having received CLEAR COMplete message the MSC knows that the old GSM connection has been released and the handover is completed.

The handover procedure according to the invention can be applied also to handover between two DECT fixed parts FP connected to mobile exchange MSC. In that case the terminal may also be an ordinary DECT terminal instead of the dual mode terminal according to the invention. The procedure is similar to that described with reference to FIG. 3 except that no GSM base station and no mobile station part MS of the dual mode terminal is involved.

In the invention it is assumed that the handover is not seamless. In other words, a short break in the call may be noticed. A typical situation where the handover occurs is when a dual mode terminal which is in connection with a GSM base station outside an office building enters the office building covered by a DECT system. Normally, this results in the loss of GSM connection and the inventive handover procedure is initiated.

The figures and the associated descriptions are intended only to illustrate the present invention. The present invention may vary in scope and spirit as illustrated in the attached claims.

We claim:

1. A method in a mobile telecommunications system including a fixed network comprising a plurality of mobile exchanges, a plurality of first base stations connected to said mobile exchanges and a plurality of second base stations of a cordless telephone system, said second base stations being connected to and under control of said mobile exchanges, a plurality of dual mode subscriber terminals, each of said dual mode subscriber terminals including a mobile station part for radio communication with said first base stations and a cordless telephone part for radio communication with said second base stations, said method being for performing handover from one of said first base stations to one of said second base stations, comprising:

initiating a call re-establishment procedure from said cordless telephone part of one of said dual mode subscriber terminals during an on-going call via said mobile station part of said one of said dual-mode terminals and one of said first base stations;

sending a call setup message from said cordless telephone part of said one of said dual mode terminals to one of said second base stations having an appropriate field strength, said call setup message including a terminal identity and a call re-establishment message indicator;

sending a call re-establishment message from said one of said second base stations to one of said mobile exchanges in response to receipt of said call setup message with said call re-establishment indicator, said call re-establishing message including said terminal identity; and re-establishing said on-going call to said cordless telephone part of said one of said dual mode terminals via said one of said second base stations.

2. A method according to claim 1, wherein said initiating said call re-establishment procedure further comprises:

detecting a loss or a low quality of a connection between said one of said first base stations and said mobile station part of said one of said dual mobile terminals during said on-going call, requesting said cordless telephone part of said one of said dual mode terminals to initiate a call re-establishment procedure.

3. A method according to claim 1, wherein said initiating said call re-establishment procedure is performed in response to a) detecting an appropriate field strength of one of said second base stations by said cordless telephone part of said one of said dual mobile terminals, and b) observing that a priority of use of said one of said second base stations is higher than a priority of use of said one of said first base stations.

4. A method according to claim 1, wherein said re-establishing said on-going call comprises:

analyzing said call re-establishment message at said one of said mobile exchanges;

sending a resource assignment message to said one of said second base stations;

sending an acknowledgement to said one of said mobile exchanges in response to said resource assignment message; and commanding said one of said first base stations to release resources associated with a former connection with said mobile station part of said one of said dual mode terminals.

5. A dual mode subscriber terminal in a mobile telecommunications system including a fixed network comprising a plurality of mobile exchanges, a plurality of first base stations connected to said mobile exchanges, and a plurality of second base stations of a cordless telephone system, said second base stations being connected to and under control of said mobile exchanges, said dual mode subscriber terminal comprising:

a mobile station part for radio communication with said first base stations;

a cordless telephone part for radio communication with said second base stations;

means responsive to detecting a predetermined condition during an on-going call via one of said first base stations and said mobile station part of said dual mode terminal, for activating said cordless telephone part of said dual mode terminal to initiate a call re-establishment procedure; and means for sending a call setup message to one of said second base stations from said cordless telephone part of said dual mode terminal, said message including a terminal identity and a call re-establishment message indicator, wherein said call re-establishment procedure includes sending a call re-establishment message to one of said mobile exchanges.

6. A dual mode subscriber terminal according to claim 5, wherein said predetermined condition includes at least one of a plurality of following conditions: a) low quality or loss of a connection between said one of said first base stations and said mobile station part of said dual mode terminal during said on-going call, and b) an appropriate field strength of said one of said second base stations, wherein said dual mode subscriber terminal further comprises means, in said mobile station part, for requesting said cordless telephone part of said dual mode subscriber terminal to initiate a call re-establishment procedure.

7. A dual mode subscriber terminal according to claim 5, wherein said predetermined condition includes an appropriate field strength of said one of said second base stations having a priority of use higher than a priority of use of said one of said first base stations.

8. A method in a mobile telecommunications system including a fixed network comprising a plurality of mobile exchanges, a plurality of cordless telephone terminals, and a plurality of base stations of a cordless telephone system, said base stations being connected to and under control of said mobile exchanges; said method being for performing handover from one of said cordless telephone base stations to another of said cordless telephone base stations, comprising:

detecting a low quality or a loss of connection between one of said cordless telephone terminals and said one of said cordless telephone base stations during an on-going call, detecting an appropriate field strength of another one of said cordless telephone base stations by said one of said cordless telephone terminals, sending a call setup message to said another one of said cordless telephone base stations from said one of said cordless telephone terminals, said message including a terminal identity and a call re-establishment message indicator, sending a call re-establishment message from said another one of said cordless telephone base stations to one of said mobile exchanges in response to receipt of said call setup message with said call re-establishment message indicator, said call re-establishment message including said terminal identity, re-establishing said on-going call to said one of said cordless telephone terminals via said another one of said cordless telephone base stations from said one of said mobile exchanges.

9. A method according to claim 8, wherein said re-establishing said on-going call comprises:

analyzing said call re-establishment message at said one of said mobile exchanges, sending a resource assignment message to said one of said cordless telephone base stations, sending an acknowledgement to said one of said mobile exchanges in response to said resource assignment message, commanding said one of said cordless telephone base stations to release resources associated with a former connection with said one of said cordless telephone terminals.

10. A mobile telecommunications system comprising:

a fixed network including:

a plurality of mobile exchanges;

a plurality of cordless telephone terminals; and a plurality of base stations of a cordless telephone system, said base stations being connected to and under control of said mobile exchanges; and means for performing a handover from one of said cordless telephone base stations to another of said cordless telephone stations, said means for performing said handover comprising:

means for detecting a low quality or a loss of connection between one of said cordless telephone terminals and one of said base stations during an on-going call, means for detecting an appropriate field strength of another one of said base stations by said one of said cordless telephone terminals, means for sending a call setup message to said another one of said base stations from said one of said cordless telephone terminals, said message including a terminal identity and a call re-establishment message indicator, means for sending a call re-establishment message from said another one of said base stations to one of said mobile exchanges in response to receipt of said call setup message with said call re-establishment indicator, said call re-establishment message including said terminal identity, and means for re-establishing said on-going call to said one of said cordless telephone terminals via said another one of said base stations from said one of said mobile exchanges.

11. A method according to claim 4, wherein said re-establishing said on-going call further comprises sending a call connect message from said one of said first base stations to said cordless telephone part of said one of said dual mode terminals in response to receiving said resource assignment message.

12. A mobile telecommunications system according to claim 10, wherein said means for re-establishing said ongoing call further comprises:

means for sending a resource assignment message from said one of said mobile exchanges to said one of said first base stations; and means for sending a call connect message from said one of said first base stations to said one of said cordless telephone terminals in response to receiving said resource assignment message.

\* \* \* \* \*